(12) United States Patent
Guo

(10) Patent No.: US 10,611,567 B2
(45) Date of Patent: Apr. 7, 2020

(54) PALLET DISPLACEMENT SYSTEM FOR A PALLET STORAGE ASSEMBLY

(71) Applicant: Sunring USA LLC, Stony Brook, NY (US)

(72) Inventor: Xiaoyu Guo, Mt Eden (NZ)

( * ) Notice: Subject to any disclaimer, the term of this patent is extended or adjusted under 35 U.S.C. 154(b) by 48 days.

(21) Appl. No.: 15/767,220

(22) PCT Filed: Dec. 29, 2015

(86) PCT No.: PCT/CA2015/000615
§ 371 (c)(1),
(2) Date: Apr. 10, 2018

(87) PCT Pub. No.: WO2017/113001
PCT Pub. Date: Jul. 6, 2017

(65) Prior Publication Data
US 2019/0071248 A1   Mar. 7, 2019

(51) Int. Cl.
*B65G 1/02*       (2006.01)
*B65G 13/11*      (2006.01)
(Continued)

(52) U.S. Cl.
CPC .............. *B65G 1/023* (2013.01); *A47F 1/12* (2013.01); *B65G 13/11* (2013.01); *B65G 39/12* (2013.01); *B65G 1/08* (2013.01)

(58) Field of Classification Search
CPC ........ B65G 1/023; B65G 13/11; B65G 39/12; B65G 1/08; A47F 1/12; A47F 1/126;
(Continued)

(56) References Cited

U.S. PATENT DOCUMENTS 4,200,201 A * 4/1980 Collins ................... G07F 11/38
                                                           221/129
5,111,942 A * 5/1992 Bernardin ............... A47F 1/126
                                                            211/59.3
(Continued)

FOREIGN PATENT DOCUMENTS

CA    2115917 A1    1/1994
CA    2250696 A1    9/1998
(Continued)

OTHER PUBLICATIONS

PCT International Search Report corresponding to PCT/CA2015/000615 dated Sep. 8, 2016.
(Continued)

*Primary Examiner* — Ko H Chan
(74) *Attorney, Agent, or Firm* — Carter, DeLuca & Farrell LLP; George Likourezos, Esq.

(57) ABSTRACT

A pallet displacement system for a pallet storage assembly, including a pair of spaced apart rail assemblies, each rail assembly including a rail having plurality of rollers rotatably mounted thereon for supporting one or more pallet, a pallet engagement element slidingly engaged to the rail and a pair of springs operatively connecting the pallet engagement element to a front end of the rail on respective sides thereof. In use, the sequential positioning of a plurality of pallets onto the rail assemblies results in a first pallet engaging the pallet engagement elements, extending the springs and therefore accumulate potential energy. When one or more of the plurality of pallets is removed from the rail assemblies, the potential energy is transformed into kinetic energy, pulling the pallet engagement elements toward the front of the rail assemblies, which in turn displaces remaining pallets toward the front.

14 Claims, 3 Drawing Sheets

(51) Int. Cl.
*A47F 1/12* (2006.01)
*B65G 39/12* (2006.01)
*B65G 1/08* (2006.01)

(58) Field of Classification Search
CPC .. A47F 5/0025; A47F 7/28; A47F 1/04; A47F 1/06; A47F 1/08; A47F 1/087; A47F 1/125; A47F 5/005; A47F 7/17; F16F 1/10
See application file for complete search history.

(56) References Cited

U.S. PATENT DOCUMENTS

| | | | |
|---|---|---|---|
| 5,285,909 A | 2/1994 | Slater | |
| 5,542,552 A * | 8/1996 | Yablans | A47F 1/126 211/43 |
| 5,570,811 A * | 11/1996 | Wittern, Jr. | G07F 11/42 221/127 |
| 6,142,317 A * | 11/2000 | Merl | A47F 1/125 211/184 |
| 6,253,954 B1 * | 7/2001 | Yasaka | G07F 11/42 221/131 |
| 6,464,089 B1 * | 10/2002 | Rankin, VI | A47F 1/126 211/59.3 |
| 7,347,335 B2 * | 3/2008 | Rankin, VI | A47F 1/126 211/59.3 |
| 8,016,128 B2 * | 9/2011 | Valiulis | A47F 1/126 211/59.3 |
| 8,190,289 B2 * | 5/2012 | Lockwood | A47F 1/126 221/15 |
| 8,234,752 B2 * | 8/2012 | Anderson | B60R 11/0235 16/239 |
| 8,353,425 B2 * | 1/2013 | Lockwood | A47F 1/126 221/227 |
| 8,561,817 B1 | 10/2013 | Allen | |
| 8,646,650 B2 * | 2/2014 | Lockwood | A47F 1/126 211/1.51 |
| 9,173,504 B2 * | 11/2015 | Hardy | A47F 1/126 |
| 9,713,395 B2 * | 7/2017 | Pichel | A47F 1/125 |
| 10,154,739 B2 * | 12/2018 | Turner | A47F 1/125 |
| 2006/0163272 A1 * | 7/2006 | Gamble | A47F 1/126 221/227 |
| 2013/0026176 A1 * | 1/2013 | Brugmann | A47F 1/126 221/154 |
| 2015/0157142 A1 * | 6/2015 | Turner | A47F 1/125 211/59.3 |

FOREIGN PATENT DOCUMENTS

| | | |
|---|---|---|
| EP | 196582 A2 | 10/1986 |
| EP | 319880 A1 | 6/1989 |
| WO | 2012118307 A2 | 9/2012 |

OTHER PUBLICATIONS

Extended European Search Report dated Aug. 19, 2019 corresponding to counterpart Patent Application EP 15911661.5.

* cited by examiner

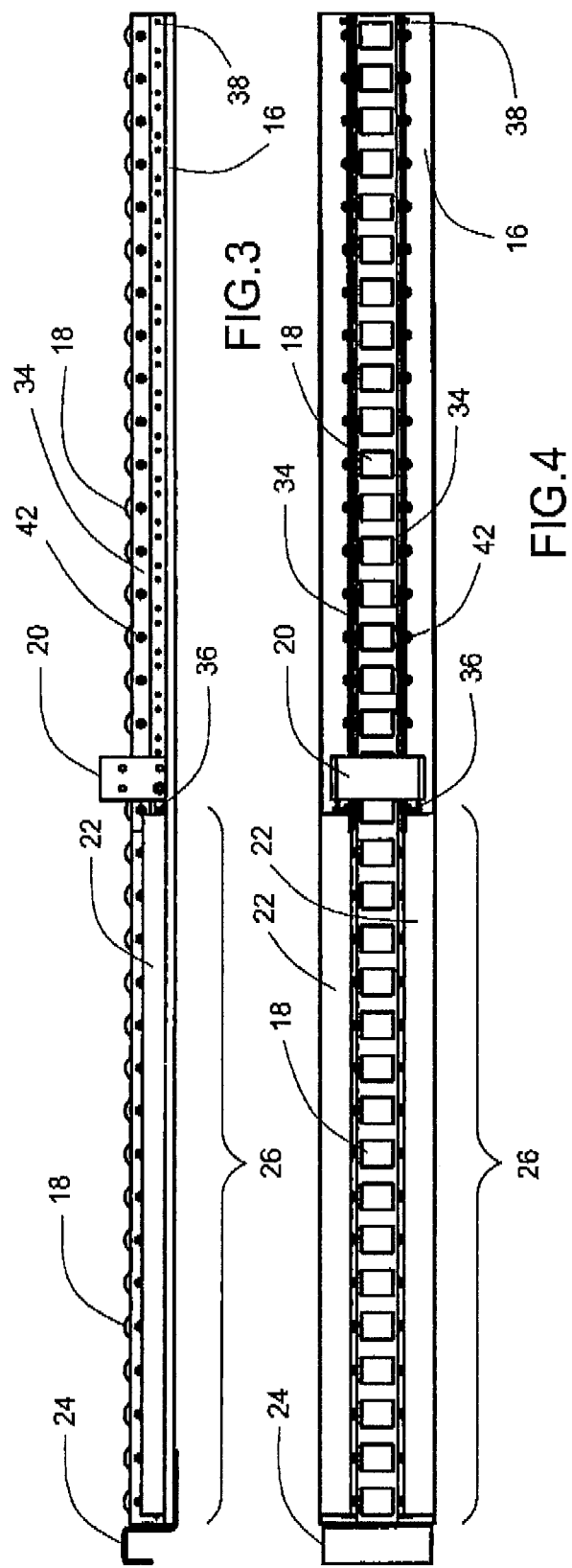

PALLET DISPLACEMENT SYSTEM FOR A PALLET STORAGE ASSEMBLY

TECHNICAL FIELD

The present disclosure relates to a pallet displacement system for a pallet storage assembly.

BACKGROUND

There exist a plurality of pallet storage assemblies, but they all essentially require a small slope to properly operate and displace stored pallets.

Accordingly, there is a need for a pallet displacement system allowing easy displacement of pallets stored in a pallet storage assembly.

SUMMARY

A general object of the present invention is to provide a pallet displacement system for a pallet storage assembly.

Some of the advantages of the present disclosure are as follows:

- non-motorized system, 'last in-first out' system that can hold up a plurality of pallets deep with rails that are not inclined;
- pallets are maintained perfectly horizontal: goods will not drift or fall;
- pallets never move once placed inside the pallet storage assembly, onto the pallet displacement system—the pallet displacement system moves the pallets;
- can be installed on conventional standard pallet storage assemblies;
- length of rails can be altered on-site;
- loading/unloading pallets is quick and easy;
- no motors: maintenance-free (no grease or periodic lubrication required/rust-proof); and
- can be made of robust materials resistant to low temperatures down to about −30° C. (about −22° F.).

Accordingly, there is provided a pallet displacement system for a pallet storage assembly, comprising:

a pair of spaced apart rail assemblies, each rail assembly including:

a rail having plurality of rollers rotatably mounted thereon for supporting one or more pallet;

a pallet engagement element slidingly engaged to the rail; and a pair of springs operatively connecting the pallet engagement element to a front end of the rail on respective sides thereof;

wherein sequentially positioning a plurality of pallets onto the rail assemblies results in a first pallet engaging the pallet engagement elements, extending the springs and therefore accumulate potential energy, which potential energy is transformed into kinetic energy as one or more of the plurality of pallets is removed from the rail assemblies, pulling the pallet engagement elements toward the front of the rail assemblies, which in turn displaces remaining pallets toward the front.

There is also provided a pallet displacement system as described above further comprising a first and second displacement guides positioned on respective sides of the rail and wherein the pallet engagement element includes:

a main body to which the springs are secured;

a first and second upper bearings configured to run atop the first and second displacement guides, respectively; and a first and second lower bearings configured to run under the first and second displacement guides, respectively.

BRIEF DESCRIPTION OF THE FIGURES

Embodiments of the disclosure will be described by way of examples only with reference to the accompanying drawings, in which:

FIG. 3 is a side view of the rail assembly;

FIG. 4 is a top view of the rail assembly; and

Similar references used in different Figures denote similar components.

DETAILED DESCRIPTION

Generally stated, the non-limitative illustrative embodiment of the present disclosure provides a pallet displacement system for a pallet storage assembly that can be used with, for example, wooden, steel or plastic pallets.

Figure 1:
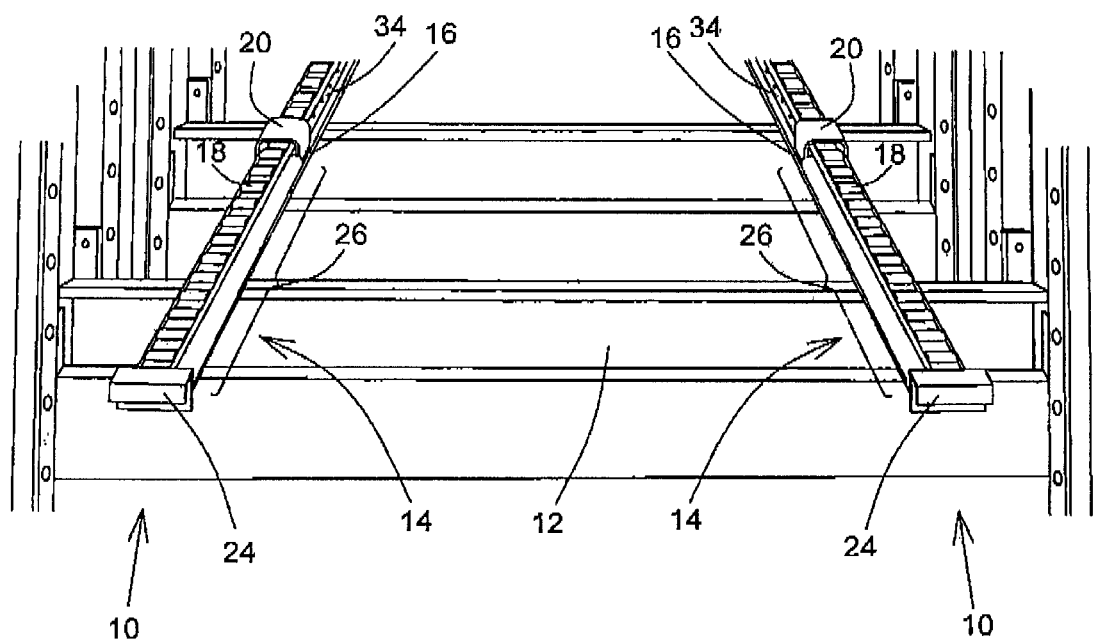
FIG. 1 is a front perspective view of a pallet displacement system 10 in accordance with an illustrative embodiment of the present disclosure.

Referring to FIG. 1, there is shown a pallet displacement system 10 for a pallet storage assembly 12 in accordance with an illustrative embodiment of the present disclosure. The pallet displacement system 10 includes a pair of rail assemblies 14 for each row of pallets, with each pallet being simultaneously supported by both rail assemblies 14. The pallets can be placed on and removed from the pallet displacement system 10 using conventional forklift trucks or the like.

Figure 2:
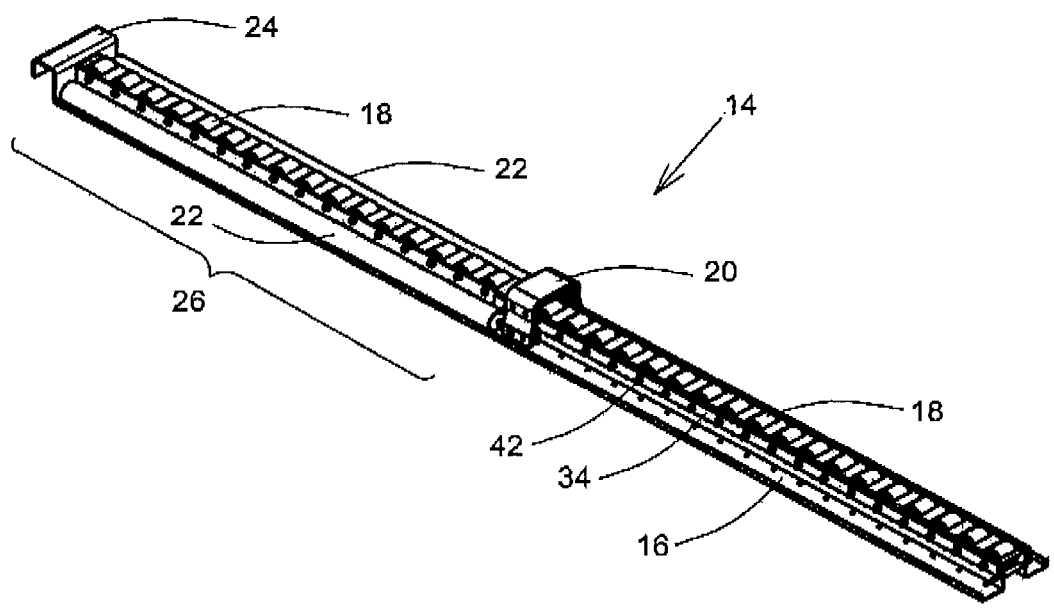
FIG. 2 is a top perspective view of the rail assembly.

With further reference to FIGS. 2 to 4, each rail assembly 14 includes a rail 16, secured to the structure of the supporting structure of the pallet storage assembly 12, which is provided with a plurality of rollers 18 rotatably mounted thereon for supporting and displacing one or more pallet, a pallet engagement element 20, slidingly engaged to the rail 16, and a pair of springs 22, for example coil springs, operatively connecting the pallet engagement element 20 to the front end 24 of the rail 16 on respective sides thereof.

An initial loading portion 26 is defined by the space between the front end 24 of the rail 16 and the pallet engagement element 20 when the springs 22 are not under load. In the illustrative embodiment, the length of the springs 22 is selected such that the loading portion 26 is of a length sufficient to fully accommodate the full length of a pallet. In an alternative embodiment, the length of the initial loading portion 26 may be adjustable, for example to cater to various pallet sizes, by providing a displaceable stop mechanism to prevent the pallet engagement element 20 from moving any closer to the front end 24 of the rail 16, which results in a constant minimum tension in the springs 22.

In use, a first pallet is placed on the initial loading portions 26 of the rail assemblies 14 on top of the rollers 18. A second pallet pushes on the first one, which rolls over the rollers 18 until it engages the pallet engagement elements 20. As the second pallet is pushed further, the springs 22 are put under tension an accumulate potential energy, and so forth for any additional pallets. The front ends 24 may be provided with a high friction surface or be of a height greater than that of the rollers to ensure that the pallets remain in position when the springs 22 are under tension.

When a pallet is removed from the pallet displacement system 10, the potential energy accumulated in the springs 22 is converted into kinetic energy that pulls the pallet engagement elements 20 toward the front of the rail assemblies 14, which in turn displaces the remaining pallets toward the front of the rail assemblies 14 until a pallet enters in contact with the front ends 24 thereof.

It is to be understood that in an alternative embodiment the length of the loading portion 26 may be shorter than the length of a pallet, in which case during the initial loading of a pallet unto the pallet displacement system 10 the forklift operator engages the pallet engagement elements 20 as he places the pallet onto the rail assemblies 14.

Figure 5:
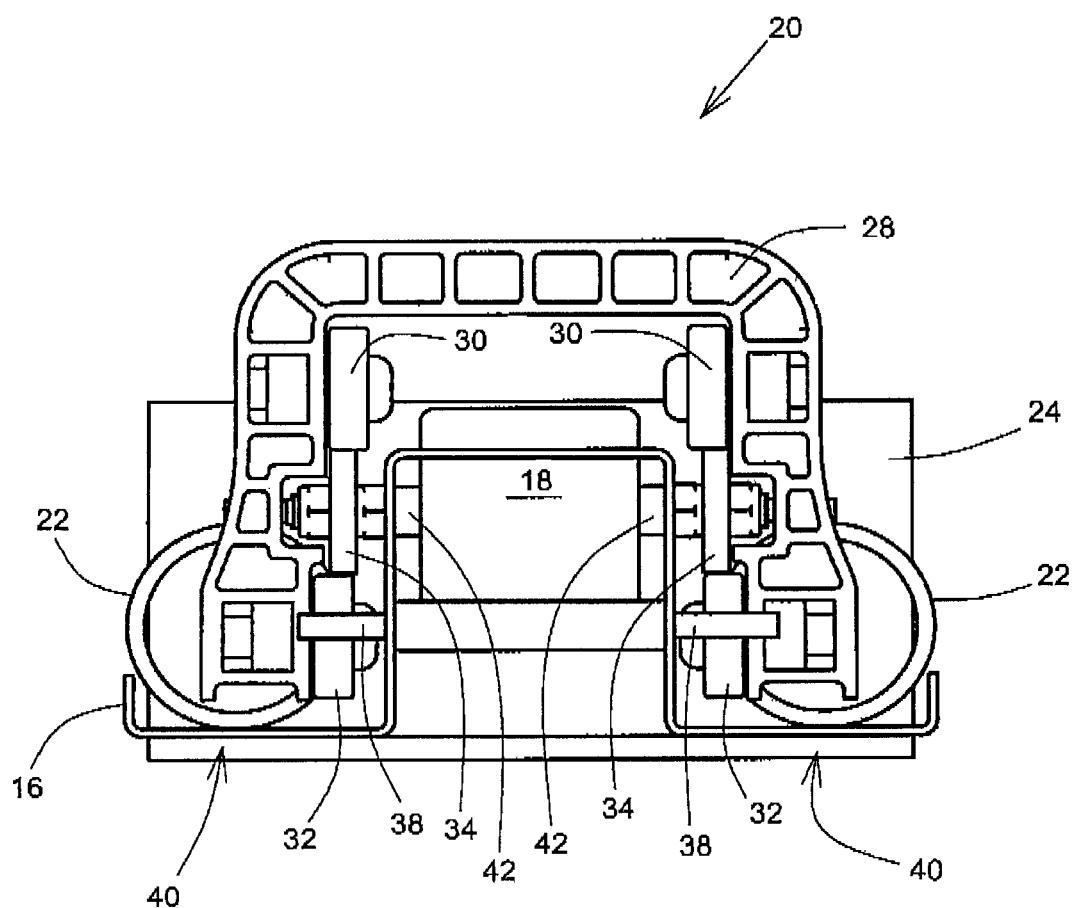
FIG. 5 is rear view of the rail assembly.

Referring now to FIG. 5, each pallet engagement element 20 includes a main body 28, to which the springs 22 are secured to, and upper 30 and lower 32 pairs of bearings configured to run atop and under respective displacement guides 34 that ensure that the pallet engagement element 20 moves linearly along the rail 16. Front 36 and back 38 stoppers limit the displacement of the pallet engagement element 20 along the rail 16.

In the alternative embodiment where the length of the initial loading portion 26 is adjustable, the position of the front 36 stopper may be adjustable along the rail 16 so as to fulfill the role of the stop mechanism, preventing the pallet engagement element 20 from moving any closer to the front end 24 of the rail 16 and therefore setting the length of the initial loading portion 28 to a desired length.

In the illustrative embodiment, the rail 16 is shaped so as to provide side channels 40 for supporting therein a respective spring 22 and a central inversed U portion to which are secured the rollers 18 and displacement guides 34. The displacement guides 34 may be secured to the rail 16, for example, via the axles 42 of the rollers 18.

It is to be understood that the length, diameter and material of the springs 22 are selected accordingly to the force required to move the combined weight of the pallets to be moved by the pallet displacement system 10, which is well known in the art.

Although the present disclosure has been described with a certain degree of particularity and by way of an illustrative embodiment and examples thereof, it is to be understood that the present disclosure is not limited to the features of the embodiments described and illustrated herein, but includes all variations and modifications within the scope of the disclosure and as hereinafter claimed.

What is claimed is:

1. A pallet displacement system for a pallet storage assembly, comprising:
   a pair of spaced apart rail assemblies, each rail assembly including:
      a rail shaped so as to provide a central inversed U portion, the central inversed U portion having plurality of rollers rotatably mounted thereon for supporting one or more pallet;
      a pallet engagement element slidingly engaged to the rail; and
      a pair of springs operatively connecting the pallet engagement element to a front end of the rail on respective sides thereof,
   wherein the rail is further shaped so as to provide side channels for supporting therein a respective spring, and
   wherein sequentially positioning a plurality of pallets onto the rail assemblies results in a first pallet engaging the pallet engagement elements, extending the springs and therefore accumulate potential energy, which potential energy is transformed into kinetic energy as one or more of the plurality of pallets is removed from the rail assemblies, pulling the pallet engagement elements toward the front of the rail assemblies, which in turn displaces remaining pallets toward the front.

2. The pallet displacement system in accordance with claim 1, wherein the pair of springs are coil springs.

3. The pallet displacement system in accordance with claim 2, wherein front end of each rail, of the pair of rail assemblies, includes a high friction surface.

4. The pallet displacement system in accordance with claim 1, wherein front end of each rail assembly of the pair, which is of a height greater than that of the plurality of rollers.

5. The pallet displacement system in accordance with claim 1, further comprising a front and a back stoppers positioned in a space apart configuration along each rail assembly of the pair so as to limit displacement of each pallet engagement element.

6. The pallet displacement system in accordance with claim 5, wherein the position of the front stopper is adjustable.

7. The pallet displacement system in accordance with claim 1, further comprising a first and second displacement guides positioned on respective sides of each rail and wherein each pallet engagement element includes:
   a main body to which the springs are secured;
   a first and second upper bearings configured to run atop the first and second displacement guides, respectively; and
   a first and second lower bearings configured to run under the first and second displacement guides, respectively.

8. A pallet storage assembly, comprising:
   a supporting structure;
   a pair of spaced apart rail assemblies secured to the supporting structure, each rail assembly including:
      a rail shaped so as to provide a central inversed U portion, the central inversed U portion having plurality of rollers rotatably mounted thereon for supporting one or more pallet;
      a pallet engagement element slidingly engaged to each rail; and
      a pair of springs operatively connecting the pallet engagement element to a front end of the rail on respective sides thereof,
   wherein the rail is further shaped so as to provide side channels for supporting therein a respective spring, and
   wherein sequentially positioning a plurality of pallets onto the rail assemblies results in a first pallet engaging the pallet engagement elements, extending the springs and therefore accumulate potential energy, which potential energy is transformed into kinetic energy as one more of the plurality of pallets is removed from the rail assemblies, pulling the pallet engagement elements toward the front of the rail assemblies, which in turn displaces remaining pallets toward the front.

9. The pallet storage assembly in accordance with claim 8, wherein each of the springs are coil springs.

10. The pallet storage assembly in accordance with claim 8, wherein front end of each rail includes a high friction surface.

11. The pallet storage assembly in accordance with claim 9, wherein front end of each rail is of a height greater than that of the plurality of rollers.

12. The pallet storage assembly in accordance with claim 8, further comprising a front and a back stoppers positioned in a spaced apart configuration along each rail so as to limit displacement of each pallet engagement element.

13. The pallet displacement system in accordance with claim 12, wherein the position of the front stopper is adjustable.

14. The pallet displacement system in accordance with claim 8, further comprising a first and second displacement guides positioned on respective sides of each rail and wherein each pallet engagement element includes:
- a main body to which the springs are secured;
- a first and second upper bearings configured to run atop the first and second displacement guides, respectively; and
- a first and second lower bearings configured to run under the first and second displacement guides, respectively.

\* \* \* \* \*